United States Patent [19]
Baumstark et al.

[11] Patent Number: 6,031,038
[45] Date of Patent: Feb. 29, 2000

[54] AQUEOUS POLYMER EMULSION

[75] Inventors: Roland Baumstark, Neustadt; Michael Portugall, Wachenheim, both of Germany

[73] Assignee: BASF Aktiengesellschaft, Ludwigshafen, Germany

[21] Appl. No.: 08/817,706

[22] PCT Filed: Oct. 25, 1995

[86] PCT No.: PCT/EP95/04180

§ 371 Date: May 5, 1997

§ 102(e) Date: May 5, 1997

[87] PCT Pub. No.: WO96/14355

PCT Pub. Date: May 17, 1996

[30] Foreign Application Priority Data

Nov. 4, 1994 [DE] Germany .............................. 44 39 457

[51] Int. Cl.[7] ...................................................... C08F 2/16
[52] U.S. Cl. .................. 524/460; 523/201; 524/458; 524/521; 428/500; 428/515; 428/520; 428/522; 428/523
[58] Field of Search ............................ 523/201; 524/458, 524/460, 521; 428/500, 515, 520, 522, 523

[56] References Cited

U.S. PATENT DOCUMENTS

| | | |
|---|---|---|
| 3,454,516 | 7/1969 | Victorius . |
| 3,455,861 | 7/1969 | Bresciani et al. . |
| 4,150,005 | 4/1979 | Gehman et al. ......................... 523/201 |
| 4,594,383 | 6/1986 | Fogg et al. ............................... 524/510 |
| 5,447,970 | 9/1995 | Tomita et al. ........................... 523/201 |
| 5,468,800 | 11/1995 | Folsch et al. ............................ 524/458 |
| 5,472,996 | 12/1995 | Hayashi et al. ......................... 523/201 |

FOREIGN PATENT DOCUMENTS

| | | |
|---|---|---|
| 0 184 091 | 11/1985 | European Pat. Off. . |
| 0 376 096 | 12/1989 | European Pat. Off. . |
| 379 892 | 1/1990 | European Pat. Off. . |
| 0 488 605 | 11/1991 | European Pat. Off. . |
| 522789 | 1/1993 | European Pat. Off. . |
| 0 609 756 | 1/1994 | European Pat. Off. . |
| 0 609 793 | 1/1994 | European Pat. Off. . |
| 1 220 613 | 8/1961 | Germany . |
| 43 34 178 | 10/1993 | Germany . |
| 93 01 444 | 6/1994 | Germany . |
| WO A 95 09896 | 4/1995 | WIPO . |

*Primary Examiner*—Judy M. Reddick
*Attorney, Agent, or Firm*—Oblon, Spivak, McClelland, Maier & Neustadt, P.C.

[57] ABSTRACT

An aqueous polymer emulsion contains a dispersed polymer A, which is obtainable by free radical aqueous emulsion polymerization of different monomer compositions in two successive stages and has ureido groups, and a polyaldehyde compound.

24 Claims, No Drawings

AQUEOUS POLYMER EMULSION

The present invention relates to an aqueous polymer emulsion containing

A) at least one dispersed polymer A obtainable by polymerizing a composition 1 of compounds (monomers) having at least one ethylenically unsaturated group by the free radical aqueous emulsion polymerization method to a conversion of at least 90% by weight, based on the monomer composition 1 to be polymerized, (polymerization stage 1) and then polymerizing, in the presence of the product mixture of polymerization stage 1, a composition 2 of compounds (monomers) having at least one ethylenically unsaturated group by the free radical aqueous emulsion polymerization method (polymerization stage 2), with the proviso that a) the composition 1 is such that random copolymerization of the composition 1 alone would give a polymer 1 whose glass transition temperature tends to the limit $Tg^1$ with increasing molecular weight,
b) the composition 2 is such that random copolymerization of the composition 2 alone would give a polymer 2 whose glass transition temperature tends to the limit $Tg^2$ with increasing molecular weight,
c) the difference between $Tg^1$ and $Tg^2$ is at least 20° C.,
d) the amount of that composition i which is assigned the lower limit $Tg^i$ is from 40 to 90% by weight, based on the total amount of the compositions 1 and 2, and
e) in addition to the monomers of the compositions 1 and 2, at least one adhesion-promoting monomer which differs from these monomers and has at least one ethylenically unsaturated group and at least one group of the general

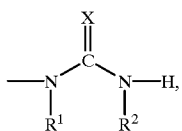

(I)

where
X is O or S and
$R^1$ and $R^2$ are both hydrogen or $C_1$–$C_5$-alkyl or both together form a bridging $C_2$–$C_4$-alkylene group which may be monosubstituted or disubstituted by $C_1$–$C_4$-alkoxy and/or hydroxyl,
is polymerized in an amount of from 0.1 to 30, frequently from 0.5 to 10, preferably from 1 to 5, very particular from 1 to 3, % by weight, based on the total amount of the monomers to be polymerized, B) at least one chemical compound B having at least two unprotected and/or reversibly protected aldehyde groups, with the proviso that the molar ratio R of all the groups I contained in the aqueous polymer emulsion to the total molar amount of unprotected and/or reversibly protected aldehyde groups contained in the aqueous polymer emulsion in the form of compounds B is from 0.1:1 to 10:1, and C) no carboxylic hydrazide.

The present invention furthermore relates to processes for the preparation of novel aqueous polymer emulsions and their use for coating, adhesive bonding, sealing and impregnating, their use as binders for coating materials and in particular glazes being preferred.

Aqueous polymer emulsions are fluid systems which contain polymer particles distributed in stable disperse form as the disperse phase in the aqueous dispersing medium. The diameter of the polymer particles is in general mainly from 0.01 to 5 μm, frequently mainly from 0.01 to 1 μm.

As in the case of polymer solutions on evaporation of the solvent, aqueous polymer emulsions have the ability to form transparent polymer films on evaporation of the aqueous dispersing medium, and it is for this reason that said emulsions are widely used as binders, for example for surface coatings or materials for coating leather.

In contrast to the polymer solution, however, the type of dispersed polymer and the temperature at which film formation takes place determine whether an aqueous polymer emulsion forms a cohesive transparent film or a brittle, opaque pulverizable layer after evaporation of the water. The lowest temperature at which a transparent film without cracks is just formed is to be referred to below as the minimum film formation temperature (MFT) of the relevant aqueous polymer emulsion. No film formation takes place below the MFT (cf. Ullmanns Encyklopädie der technischen Chemie, Vol. 19, 4th edition, Verlag Chemie, Weinheim (1980), page 17).

It is generally known that aqueous emulsions of polymers which essentially contain only polymerized monomers whose homopolymers have low glass transition temperatures Tg (in this publication, Tg is the limit of the glass transition temperature to which, according to G. Kanig, Kolloid-Zeitschrift & Zeitschrift für Polymere, Vol. 190, page 1, equation 1, the glass transition temperature tends with increasing molecular weight, determined by the DSC method (Differential Scanning Calorimetry, 20° C./min, midpoint); the Tg values for the homopolymers of most monomers are known and are stated, for example, in Ullmann's Encyclopedia of Industrial Chemistry, VCH Weinheim, 1992, fifth edition, Vol. A21, page 169; other sources of glass transition temperatures of homopolymers are, for example, J. Brandrup, E. H. Immergut, Polymer Handbook, 1st edition, J. Wiley, New York 1966, 2nd edition, J. Wiley, New York 1975, and 3rd edition, J. Wiley, New York, 1989) (ie. soft monomers) are as a rule also capable of forming polymer films at appropriately low temperatures. However, a disadvantage of the resulting films is that they are too soft and too tacky for many applications. This is a disadvantage in that such films readily become soiled, for example through the adhesion of dust. In particular, coatings produced from such films usually also have a low blocking temperature. The latter is the temperature at which such coatings stick together when they are brought into contact with one another under a predetermined contact pressure for some time. Above the blocking temperature, coatings adhere to one another and can no longer be separated from one another without the coatings being damaged. Blocking can also occur if the coatings are not tacky to the touch. The blocking temperature is important particularly when substrates provided with coatings based on aqueous polymer emulsions are to be stacked one on top of the other or freshly painted windows are to be closed. When the coatings are brought into contact below the blocking temperature, they can be separated from one another again essentially without the use of force and without being damaged.

It is also generally known that aqueous emulsions of polymers which contain essentially only polymerized hard monomers (monomers whose homopolymers have a high glass transition temperature Tg) generally have a high blocking temperature. However, the disadvantage of these aqueous polymer emulsions is that they also require a high temperature for film formation.

It is true that to a certain extent the MFT and blocking temperature (BT) can be adapted to the desired application by copolymerization of hard and soft monomers or by mixing aqueous emulsions of hard polymers with aqueous emulsions of soft polymers or by adding plasticizers. However, the disadvantage of these adaptation measures is that they generally change the MFT and BT to the same extent, ie. they usually increase or decrease the BT and the MFT to a comparable extent.

In terms of application, however, it is desirable to have adaptation measures which are capable of increasing the temperature difference between MFT and BT.

EP-A 184 091, EP-A 376 096, German Published Application 1,220,613, U.S. Pat. No. 3,454,516, EP-A 609 756 and EP-A 379 892 disclose that the abovementioned aim can be essentially realized by spatially combining the free radical aqueous emulsion polymerization in two successive stages, one of the two stages mainly comprising soft polymers and the other stage mainly comprising hard monomers. Surprisingly, the sequence of the two stages, ie. whether the hard stage is polymerized first and then the soft stage or vice versa, tends to play a minor role. For example, EP-A 379 892 describes the sequence hard/soft, whereas EP-A 184 091 uses the sequence soft/hard. Both EP-A 184 091 and EP-A 379 892 furthermore describe the polymerization of a nitrogen-containing adhesion-promoting monomer in order to increase the adhesion of the films of such aqueous polymer emulsions to many materials, such as wood, metal, minerals, paper, textiles and plastic, but in particular to old surface coatings based on drying oils and/or alkyd resins, and to reduce the sensitivity of the adhesion to the effect of humidity and moisture (increased wet adhesion).

However, the disadvantage of these prior art aqueous polymer emulsions is that they are essentially satisfactory with regard to the balance of BT and MFT as well as wet adhesion but do not exhibit satisfactory behavior with regard to their resistance to blooming under the action of moisture.

It is an object of the present invention to provide aqueous polymer emulsions which are completely satisfactory both with regard to the balance of BT and MFT and in terms of wet adhesion but at the same time have greater resistance to blooming.

We have found that this object is achieved by the aqueous polymer emulsions described at the outset.

The further prior art below may be used as a basis. EP-A 609 793 discloses aqueous polymer emulsions which contain an emulsion polymer having polymerized units of an ethylenically unsaturated monomer which is capable of free radical polymerization and has a pendent alkyleneurea group and a crosslinking component which may have two protective aldehyde groups. EP-A 609 793 finds that advantageous properties of such aqueous polymer emulsions are that, on the one hand, they have a long shelf life and, on the other hand, they form crosslinked films (postcrosslinking) which have less sensitivity to the action of organic solvents. Apart from the remark that the abovementioned type of crosslinking can also be applied to multistage emulsion polymers, EP-A 609 793 relates only to one-stage emulsion polymers.

EP-A 184 091 recommends, as binders for nonblocking surface coatings, aqueous polymer emulsions which are prepared in two successive polymerization stages having different monomer compositions and whose disperse polymers may contain, as polymerized units, ethylenically unsaturated monomers having groups (I) in addition to ethylenically unsaturated aldehydes. However, the disadvantage of EP-A 184 091 is that, although it recommends the copolymerization of ethylenically unsaturated aldehydes for the purpose of increasing the internal strength of the surface coating, it assumes that such an increase in the internal strength occurs only when a certain amount, based on the amount of the polymerized ethylenically unsaturated aldehyde, of dicarboxylic dihydrazide which chemically binds the aldehyde groups is stirred into the surface coating.

EP-A 488 605, which recommends the copolymerization of ethylenically unsaturated monomers having groups (I) as formaldehyde scavengers, disclosed that groups (I) are capable of forming chemical bonds with aldehyde groups.

U.S. Pat. No. 3,455,861 recommends stirring urea/formaldehyde resins, ie. resins which have groups (I), into aqueous polymer emulsions which contain ethylenically unsaturated aldehydes as polymerized units, in order to increase the internal strength of their films.

DE-A 4 334 178 relates only to aqueous emulsions of emulsion polymers which are produced in one stage and have the combination of polyaldehyde and polymerized group (I).

In principle, the novel procedure can advantageously be applied to all hard/soft or soft/hard sequences mentioned in evaluating the prior art. These are in particular the sequences of EP-A 609 756, EP-A 379 892, EP-A 184 091, EP-A 376 096, German Published Application 1,220,613 and der U.S. Pat. No. 3,454,516.

However, those novel aqueous polymer emulsions in which the amount of that monomer composition i which is assigned the lower limit $Tg^i$ is from 60 to 80, preferably from 70 to 80%, by weight, based on the total amount of the compositions 1 and 2, are advantageous. The magnitude of the difference between $Tg^1$ and $Tg^2$ may be at least 30, 40, 50, 60, 70, 80, 90, 100, 120, 150° C. or more and as a rule is therefore from 20 to 150° C.

With regard to applications, the magnitude of the difference between $Tg^1$ and $Tg^2$ is advantageously from 60 to 120° C. or from 40 to 80° C.

It is also advantageous if the lower limit $Tg^i$ is from −60 to 35° C., preferably from −30 to +35° C., very particularly preferably from −20 to +20° C.

Correspondingly, it proves advantageous if the higher of the two limits $Tg^i$ is from >50 to 130° C., preferably from 60 to 120° C., very particularly preferably from 95 to 115° C.

In the case of a specified $Tg^i$ for the monomer composition i, the monomer composition i can be established in a simple manner by means of the Fox equation. According to Fox (T. G. Fox, Bull. Am. Phys. Soc. (Ser. II) 1, (1956), 123, and Ullmanns Encyklopädie der technischen Chemie, Verlag Chemie, Weinheim, 1980, Vol. 19, 4th Edition, page 18) a good approximation for the glass transition temperature of random copolymers is $$\frac{1}{Tg} = \frac{X^1}{Tg^1} + \frac{X^2}{Tg^2} + \cdots \frac{X^n}{Tg^n},$$

where $X^1, X^2, \cdots, X^n$ are the mass fractions of the monomers 1, 2, ..., n and $Tg^1, Tg^2, \ldots, Tg^n$ are the glass transition temperatures, in degrees Kelvin, of the polymers composed only of one of the monomers 1, 2 ..., or n.

A random copolymer having a monomer composition i can be realized experimentally by polymerizing a corresponding monomer mixture by aqueous emulsion free radical polymerization by the feed method. In this procedure, the monomer mixture is preemulsified in the aqueous phase and is fed into the polymerization vessel at the rate of consumption with the addition of initiators so that the polymerization conversion of the monomers present in the polymerization vessel is ≧99% by weight. Preferred initiators are sodium peroxodisulfate, and the polymerization temperature is usually from 60 to 90° C. The polymerization pressure may be ≧1 atm, depending on the monomers. The dispersants used may be the substances recommended in this publication for the preparation of the novel aqueous polymer emulsions. The molecular weight can be established in a manner known per se by the concommitant use of molecular weight regulators (eg. mercaptans) and/or by means of the amounts of initiator used. In the absence of molecular weight regulators and using from 0.1 to 2% by weight, based on the amount of monomers, of polymerization initiator, an aqueous polymer emulsion whose glass transition temperature corresponds to the limiting Tg can be obtained.

The novel aqueous polymer emulsions include both those in which the polymerization stage 1 relates to the monomer composition which is assigned the lower limit $Tg^i$, ie. those which have the soft/hard sequence of stages, and those in which the polymerization stage 1 relates to the monomer composition which is assigned the higher limit $Tg^i$, ie. those which have the hard/soft sequence of stages, the former (soft/hard) being preferred.

The polymer A advantageously contains monomers having groups I, as polymerized units, in amounts of from 0.5 to 10, preferably from 1 to 5, very particularly preferably from 1 to 3, % by weight, based on the total amount of the monomers polymerized in A. The molar ratio R is advantageously chosen to be from 1:0.1 to 2, preferably from 1:0.1 to 1, very particularly preferably from 1:0.5 to 1.

Preferred groups I are:

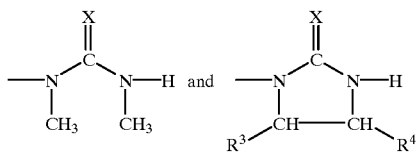

where each of the two substituents $R^3$ and $R^4$ may be hydrogen, hydroxyl or $C_{1-4}$-alkoxy.

Preferred groups among the latter in turn are those in which $R^3$ and $R^4$ are both simultaneously hydrogen or $R^3$ is hydrogen and $R^4$ is $C_1$–$C_4$-alkoxy. Very generally, X is preferably oxygen.

Suitable copolymerizable monomers having groups I are those of the general formula II

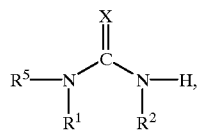

(II)

where $R^5$ is a radical which has at least one ethylenically unsaturated C=C bond.

Examples of radicals $R^5$ are:

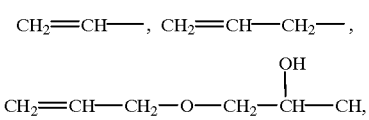

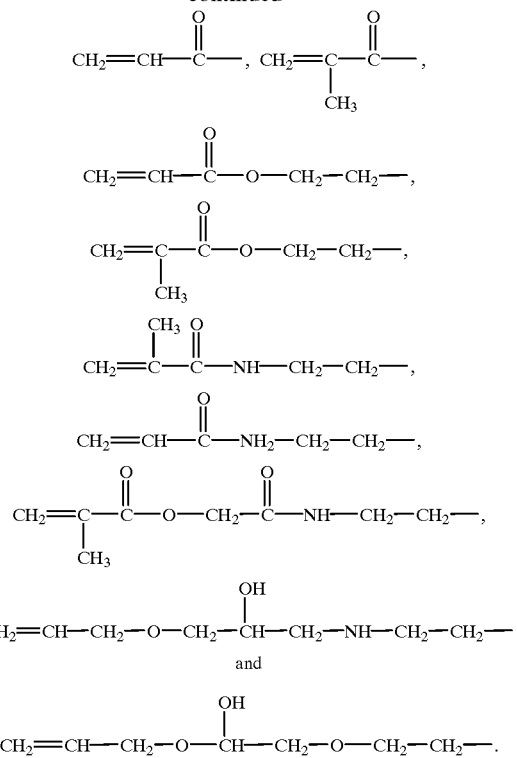

Examples of advantageous copolymerizable monomers II are: N-vinylethyleneurea, N-methacryloyloxyacetoxyethylethyleneurea, N-di(3-allyloxy-2-hydroxypropyl)aminoethylethyleneurea, N-(acrylamidoethyl)ethyleneurea, N-(2-acryloyloxyethyl)ethyleneurea, N-methacryloylaminomethylurea, allylalkylethyleneurea, N-(2-methacryloyloxyacetamidoethyl)-N,N'-ethyleneurea and in particular N-(2-methacryloyloxyethyl)ethyleneurea (also referred to as [1-(2-methacryloyloxyethyl)imidazolin-2-one]), N-(methacrylamidoethyl)ethyleneurea, N-(3-allyloxy-2-hydroxypropyl)aminoethylethyleneurea (Sipomer® WAM from Alcolac) and N-2-(allylcarbamato) aminoethylimidazolidinone (WAM IV from Air Products Chemicals).

All monomers having groups I stated in the patents cited at the outset as prior art are in principle also suitable. Corresponding monomers are also disclosed in U.S. Pat. No. 2,727,016, U.S. Pat. No. 2,871,223, U.S. Pat. No. 2,881,155, EP-B 421 185, U.S. Pat. No. 2,980,652, U.S. Pat. No. 3,194,792, U.S. Pat. No. 4,104,220, U.S. Pat. No. 4,111,877 and U.S. Pat. No. 4,559,417. Further suitable active monomers II are stated in a review article by R. W. Kreis and A. M. Sherman, Developments in Ureido Functional Monomer for Promoting Wet Adhesion in Latex Paints, Water-Borne and Higher-Solids Coating Symposium of Feb. 3–5, 1988, New Orleans, La.

Monoethylenically unsaturated monomers capable of free radical polymerization, such as styrene, α-methylstyrene, o-chlorostyrene or vinyltoluenes, esters of vinyl alcohol with monocarboxylic acids of 1 to 18 carbon atoms, such as vinyl acetate, vinyl propionate, vinyl n-butyrate, vinyl pivalate, vinyl laurate and vinyl stearate, esters of α,β-nonoethylenically unsaturated mono- and dicarboxylic acids of preferably 3 to 6 carbon atoms, in particular acrylic acid, methacrylic acid, maleic acid, fumaric acid and itaconic acid, with alkanols having in general 1 to 12, preferably 1 to 8, in particular 1 to 4, carbon atoms, especially methyl, ethyl, n-butyl, isobutyl, tert-butyl and 2-ethylhexyl acrylate and methacrylate, dimethyl maleate or n-butyl maleate, nitriles of α,β-monoethylenically unsaturated carboxylic acids, such as acrylonitrile and methacrylonitrile, and conjugated $C_4$–$C_8$-dienes, such as 1,3-butadiene and isoprene, are particularly suitable for the monomer compositions 1 and 2. Commercially available monomers VEOVA® 9–11 (VEOVA X is a trade name of Shell and relates to vinyl esters (of carboxylic acids which are also referred to as Versatic® X acids) of the general formula

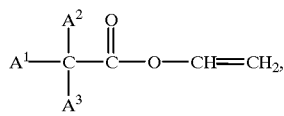

where $A^1$, $A^2$ and $A^3$ are alkyl radicals whose total number of carbon atoms ($A^1+A^2+A^3$) is equal to X minus 2, are also important).

The main part of the monomer compositions 1 and 2 is generally chosen from the abovementioned monomers and altogether accounts for more than 50% by weight, based on the particular monomer composition. Monomers which, when polymerized alone, usually give homopolymers which have high water solubility are usually contained in both monomer compositions only in modifying amounts. These are usually less than 50, as a rule less than 20, preferably from 0.1 to 10, frequently also from 0.1 to 5, % by weight, based on the total amount of the particular monomer composition. Examples of such monomers are α,β-onoethylenically unsaturated mono- and dicarboxylic acids of 3 to 6 carbon atoms and amides thereof, for example acrylic acid, methacrylic acid, maleic acid, fumaric acid, itaconic acid, acrylamide and methacrylamide, as well as vinylsulfonic acid, acrylamidopropanesulfonic acid and water-soluble salts of the abovementioned acids.

Both the monomer composition 1 and the monomer composition 2 preferably contain from 0.1 to 5% by weight, based on the particular monomer composition i, of the abovementioned modifying monomers whose homopolymers have high water solubility.

In addition to the abovementioned monomers, the monomer compositions 1 and 2 may contain minor amounts, as a rule from 0.01 to 5% by weight, based on the particular monomer composition i, of monomers which effect crosslinking of the polymer chains within the individual dispersed polymer particles. Particularly suitable in this respect are monomers having two or more nonconjugated ethylenically unsaturated groups, for example the diesters of dihydric alcohols with α,β-monoethylenically unsaturated monocarboxylic acids, among which in turn the acrylates and methacrylates are preferably used. Alkylene glycol diacrylates and dimethacrylates, such as ethylene glycol diacrylate, 1,3-butylene glycol diacrylate, 1,4-butylene glycol diacrylate and propylene glycol diacrylate, may be mentioned by way of example. Divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate are also suitable. Of course, both the monomer composition 1 and the monomer composition 2 may simultaneously comprise such precrosslinking monomers. However, it is sometimes also advantageous if only one of the two monomer compositions contains such precrosslinking agents. Frequently, they are only part of the first or of the second polymerization stage. Their exclusive use in the hard polymerization stage is particularly advantageous. However, they may also be present only in the soft polymerization stage.

It is often advantageous if at least one of the two monomer compositions 1 and 2 or both of them comprises or comprise minor amounts, usually from 0.5 to 5% by weight, based on the particular monomer composition i, of monomers which do not effect crosslinking until during film formation (postcrosslinking agents).

Particularly suitable monomers of this type are those which have an epoxy, hydroxyl or N-methylol group, for example glycidyl acrylate, N-methylolacrylamide, N-methylolmethacrylamide and monoesters of dihydric alcohols with α,β-monoethylenicially unsaturated carboxylic acids of 3 to 6 carbon atoms, such as hydroxyethyl, hydroxy-n-propyl and hydroxy-n-butyl acrylate and methacrylate. Other polymer building blocks which are suitable for postcrosslinking are those which have hydrolysable organosilicon bonds. The copolymerizable monomers methacryloyloxypropyltrimethoxysilane and vinyltrimethoxysilane may be mentioned by way of example. Further suitable polymer building blocks of corresponding type are described in DE-A 4 341 260.

If the novel aqueous polymer emulsions comprise monomers which effect precrosslinking and/or postcrosslinking, the glass transition temperatures $Tg^1$ and $Tg^2$ to be assigned in accordance with the definition to the monomer compositions 1 and 2 are understood as meaning the glass transition temperatures to be determined in the absence of these crosslinking monomers present only in minor amounts. As a rule, the precrosslinking and/or postcrosslinking has an advantageous effect on the initial blocking temperature (directly after film formation) and final blocking temperature (after several days).

The monomer compositions 1 and 2 are preferably chosen, in the manner described above, exclusively from the following monomers: n-butyl acrylate, 2-ethylhexyl acrylate, ethyl acrylate, methyl methacrylate, n-butyl methacrylate, styrene, acrylonitrile, acrylic acid, methacrylic acid, acrylamide, methacrylamide, hydroxyethyl acrylate, hydroxyethyl methacrylate, acrylamidopropanesulfonic acid and vinylsulfonic acid and the alkali metal salts thereof.

Particularly preferably, the monomer compositions 1 and 2 are chosen, in the manner described above, exclusively from the following monomers:
n-butyl acrylate, 2-ethylhexyl acrylate, methyl methacrylate, n-butyl methacrylate, acrylic acid, methacrylic acid, acrylamide and methacrylamide.

In general, it proved advantageous if, on the one hand, the monomer composition i having the lower $Tg^i$ value comprises from 10 to 40% by weight, based on the monomer composition i, of monomers whose homopolymers have Tg values above the lower $Tg^i$ and, on the other hand, the monomer composition i having the higher $Tg^i$ value simultaneously comprises from 0 to 40, preferably from 0 to 25, % by weight, based on the monomer composition i, of monomers whose homopolymers have Tg values below the higher $Tg^i$. In general, advantageous novel aqueous polymer emulsions are those whose MFT is $\leq 30°$ C., preferably $\leq 10°$ C., without the addition of film formation assistants.

The monomers having at least one group I may be present in their total amount either exclusively in the polymerization stage 1 or exclusively in the polymerization stage 2, and each of these two polymerization stages may be the hard or the soft polymerization stage. Of course, the monomers having at least one group I may also be distributed over both polymerization stages.

With regard to aqueous polymer emulsions having in the main high wet adhesion, the polymerization stage 2 preferably comprises the total amount of the monomers having at least one group I. In this case, the polymerization stage 2 is preferably the soft stage.

If a high elongation at break and high gloss of the novel aqueous polymer emulsion are desirable simultaneously with completely satisfactory wet adhesion, from 20 to 100, preferably from 30 to 100, mol %, or from 40 to 100 mol % or from 50 to 100 mol %, of the monomers to be polymerized in accordance with the definition and having at least one group I are polymerized in the polymerization stage 1, which is then preferably the soft polymerization stage.

The component B of the novel aqueous polymer formulation may be different from or identical to the component A. In the latter case, the polymer A must contain the corresponding amount of ethylenically unsaturated aldehydes as polymerized units. Examples are acrolein, methacrolein, formylstyrene, crotonaldehyde, cinnamaldehyde, citral and alkyl (meth)acrylates having one or two aldehyde groups in the alkyl radical, such as (meth)acryloyloxyalkylpropanals, as described in DE-A 27 22 097. In addition to copolymerizable aldehydes, however, copolymerizable monomers which have reversibly protected aldehyde groups are also suitable, for example hemiacetals or acetals which are stable in the alkaline range but are cleaved into aldehyde and alcohol in the acidic range. These are preferably $C_1$–$C_4$ alcohols. Examples of these are (meth)acrylamide derivatives which carry terminal acetal groups in the amide moiety, for example N-(1,1-dimethoxybut-4-yl)methacrylamide or acrylamidobutyraldehyde diethoxyacetal.

However, the component B of the novel aqueous formulations preferably differs from the component A (ie. the polymer A preferably contains no aldehyde groups) and is merely stirred into the aqueous polymer formulations. Of course, the component to be stirred may be a polymer B which differs from the polymer A, has at least two aldehyde groups and, apart from the building blocks of the polymer A which have at least one group I and the building blocks of the polymer B which have the aldehyde groups, may have the same composition as the polymer A. However, the components B are preferably low molecular weight polyaldehydes, among which the dialdehydes are particularly preferred. Examples are 1,ω-dialdehydes having 1 to 10 carbon atoms, such as glyoxal and glutardialdehyde or malondialdehyde or the acetals and hemiacetals thereof. However, compounds such as terephthaldialdehyde are also suitable. Glyoxal is particularly advantageously used. Oligomers and polymers of acrolein and/or of methacrolein are also suitable. The pH of the novel aqueous polymer formulations is not particularly critical for the action mechanism of the novel aqueous polymer formulations. It is usually from 2 to 12, preferably from >7 to 12. For their application, the novel aqueous polymer formulations can of course be mixed with aqueous polymer formulations which differ from them.

The novel aqueous polymer emulsions are preferably produced with a solids content of $\geq 40$, advantageously $\geq 50$, % by volume, based on the total aqueous polymer emulsion. As a rule, an advantageous solids content for applications is from 40 to 70% by volume.

Regarding the desired performance characteristics, it is advantageous if the weight average diameter of the dispersed polymer particles A is from 40 to 300 nm. Particularly advantageous weight average polymer particle diameters A are from 50 to 150 nm or from 50 to 100 nm. Unless the dynamic viscosity of the novel aqueous polymer emulsion plays the decisive role, the distribution of the polymer particle diameters A is preferably narrow. The nonuniformity of the polymer particle diameter distribution A should be less than 5, preferably less than 2. It is a ratio of weight average to number average polymer particle diameter.

The preparation of the dispersed polymer A is carried out according to the product by process definition of the subject according to the invention, as stated at the outset, ie. by the free radical aqueous emulsion polymerization method in the presence of dispersants and free radical polymerization initiators.

The ratio of the aqueous phase to the total amount of the monomers used in both stages is chosen according to the desired solids content of the aqueous polymer emulsion to be prepared.

The monomer composition 1 may be initially taken in its entirety as a corresponding monomer mixture in the form of an aqueous monomer emulsion in the polymerization vessel or some or all of said monomer composition 1 may be metered into said vessel in the course of the polymerization stage 1 as an emulsion in an aqueous medium or in anhydrous form. The monomer composition 1 can of course be realized only over the total polymerization stage 1 when considered in an integral manner. In this case, a monomer mixture whose composition changes as a function of time and corresponds to the monomer composition 1 only when considered in an integral manner is added to the polymerization vessel. This latter procedure is less preferable. After the end of the polymerization stage 1, the monomer composition 2 can be added in a corresponding manner to the polymerization vessel, all at once or partly or in total in the course of the polymerization stage 2, as an emulsion in an aqueous medium or in anhydrous form. The monomers to be polymerized according to the invention and having at least one group I are preferably mixed into the other monomers or the emulsions thereof and introduced in this form into the polymerization vessel. Thus, monomer mixtures whose composition is constant as a function of time are preferably added to the polymerization vessel over the particular polymerization stage, in both polymerization stages. The latter is advantageously carried out in such a way that the polymerization conversion of the monomers already added to the polymerization vessel is $\geq 90$, preferably $\geq 95$, particularly preferably $\geq 98$, % by weight at any time after the beginning of the polymerization.

In both stages, the polymerization is initiated by conventional free radical initiators. Suitable initiators are all those which are capable of initiating a free radical aqueous emulsion polymerization. These may be both peroxides, for example alkali metal or ammonium peroxodisulfate, and azo compounds, such as azobisisobutyronitrile or 4,4'-azobiscyanovaleric acid. Combined systems which are composed of at least one organic reducing agent and at least one peroxide and/or hydroperoxide, for example tert-butyl hydroperoxide and the sodium salt of hydroxymethanesulfinic acid or hydrogen peroxide and ascorbic acid, and very particularly preferably combined systems which furthermore contain a small amount of a metal compound which is soluble in the polymerization medium and whose metallic component may occur in a plurality of valency states, for example ascorbic acid/iron(II) sulfate/hydrogen peroxide, are also advantageously used, the sodium salt of hydroxymethanesulfinic acid, sodium sulfite or sodium bisulfite frequently being used instead of ascorbic acid and alkali metal peroxodisulfate and/or ammonium peroxodisulfate often being used instead of hydrogen peroxide. Instead of a water-soluble iron(II) salt, a V salt or a combination of water-soluble Fe/V salts is also frequently used. The amount of the free radical initiator systems used is preferably from 0.1 to 2% by weight, based on the total amount of the monomers to be polymerized. Depending on their type, the polymerization initiators may be initially taken all at once in the polymerization vessel in a manner known per se to a person skilled in the art or may be added continuously to said vessel at the rate at which they are consumed, ie. according to the progress of the polymerization.

The polymerization pressure and polymerization temperature are of fairly minor importance. In general, both polymerization stages are carried out at from room temperature to 100° C., preferably from 50 to 95° C., particularly preferably from 60 to 90° C. Reduced or superatmospheric pressure may be used, so that the polymerization temperature may also exceed 100° C. and may be up to 130° C. or more. Readily volatile monomers, such as ethylene or butadiene, are preferably polymerized under superatmospheric pressure. For regulating the pH of the polymerization medium, pH buffers, such as $NaHCO_3$, $Na_2CO_3$, sodium acetate or $Na_2P_2O_5$, are preferably added during the novel free radical aqueous emulsion polymerization. pH buffers are advantageously incorporated into the aqueous monomer emulsions to be introduced. Buffering is preferably effected to a pH of from 3 to 6. This measure results in the novel aqueous polymer emulsions having greater freedom from coagulum and specks (microcoagulum). Alternatively to the use of buffers, the aqueous monomer emulsion to be fed in may also be partly neutralized by means of a strong base (eg. NaOH) to a pH of from 3 to 6 before being added. The ready-to-use final pH of the novel aqueous polymer emulsions is generally increased to above 7, preferably up to 9, by adding bases, such as ammonia, alkali metal hydroxide (NaOH, KOH), alkali metal oxide, alkaline earth metal oxide, alkaline earth metal hydroxide (Ca $(OH)_2$), ZnO, metal carbonates, metal bicarbonates or amines, such as 2-amino-2-methyl-1-propanol, ethanolamine, diethanolamine, triethylamine, morpholine, N,N-dimethylethanolamine or 2-dimethylamino-2-methyl-1-propanol.

To improve the reproducibility and establish defined particle diameters, the polymer particle formation phase and polymer particle growth phase are advantageously decoupled from one another in a manner known per se to a person skilled in the art by initially taking a defined amount of a preformed aqueous polymer emulsion (a seed latex) in the polymerization vessel or preforming such an emulsion in situ in said vessel. The amount of dispersant added in the further course of the free radical aqueous emulsion polymerization is as a rule such that the critical micelle formation concentration is not exceeded and formation of new polymer particles is thus avoided. If a broad particle diameter distribution is desirable for producing highly concentrated aqueous novel polymer emulsions, seed latex is generally added to the polymerization vessel additionally during the free radical aqueous emulsion polymerization in a manner known per se. Molecular weight regulators, for example mercaptans, may of course concommitantly be used in the novel free radical aqueous emulsion polymerization. This generally facilitates the film formation (lower MFT) and thus enhances the gloss level. However, the polymerization is frequently carried out in the absence of said regulators. As in the case of free radical polymerization methods generally, the novel method can be used, in a manner known to a person skilled in the art, both under an inert gas atmosphere (eg. $N_2$, Ar) and under a nitrogen-containing atmosphere (eg. air).

Suitable dispersants which ensure in particular the stability of the novel aqueous polymer emulsion are both the protective colloids usually used for carrying out the free radical aqueous emulsion polymerization and emulsifiers.

Suitable protective colloids are, for example, polyvinyl alcohols, cellulose derivatives or vinylpyrrolidone-containing copolymers. A detailed description of further suitable protective colloids is given in Houben-Weyl, Methoden der organischen Chemie, Volume XIV/1, Makromolekulare Stoffe, Georg-Thieme-Verlag, Stuttgart, 1961, pages 411 to 420. Mixtures of emulsifiers and/or protective colloids may of course also be used. Preferably used dispersants are exclusively emulsifiers with relative molecular weights, in contrast to the protective colloids, of usually less than 2000, preferably less than 1000. They may be anionic, cationic or nonionic. Where mixtures of surfactants are used, the individual components must of course be compatible with one another, which in case of doubt can be tested by means of a few preliminary experiments. In general, anionic emulsifiers are compatible with one another and with nonionic emulsifiers. The same applies to cationic emulsifiers, whereas anionic and cationic emulsifiers are generally incompatible with one another. Useful emulsifiers are, for example, ethoxylated mono-, di- and trialkylphenols (degree of ethoxylation: 3 to 100, alkyl radical: $C_4$ to $C_{12}$), ethoxylated fatty alcohols (degree of ethoxylation: 3 to 100, preferably 6 to 50, alkyl radical: $C_6$ to $C_{20}$) and alkali metal and ammonium salts of alkylsulfates (alkyl radical: $C_8$ to $C_{18}$), of sulfuric half-esters of ethoxylated alkanols (degree of ethoxylation: 1 to 70, in particular 2 to 10, alkyl radical: $C_{10}$ to $C_{18}$) and of ethoxylated alkylphenols (degree of ethoxylation: 3 to 100, preferably 6 to 50, alkyl radical: $C_4$ to $C_{18}$) and alkali metal and ammonium salts of alkanesulfonic acids (alkyl radical: $C_{10}$ to $C_{18}$) and of alkylarylsulfonic acids (alkyl radical: $C_9$ to $C_{18}$). Further suitable emulsifiers, such as sulfosuccinates, are described in Houben-Weyl, Methoden der organischen Chemie, Volume XIV/1, Makromolekulare Stoffe, Georg-Thieme Verlag, Stuttgart, 1961, pages 192 to 208.

Compounds of the general formula I

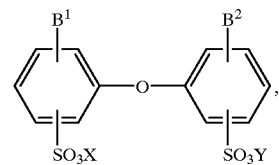

where $B^1$ and $B^2$ are each hydrogen or $C_4$–$C_{24}$-alkyl and are not simultaneously hydrogen and X and Y may be alkali metal ions and/or ammonium ions, have also proven to be suitable surfactants. In the formula I, $B^1$ and $B^2$ are each preferably linear or branched alkyl of 6 to 18, in particular 6, 12 or 16, carbon atoms or hydrogen, and $B^1$ and $B^2$ are not both simultaneously hydrogen. X and Y are preferably sodium, potassium or ammonium ions, sodium being particularly preferred. Compounds I in which X and Y are sodium, $B^1$ is a branched alkyl radical of 12 carbon atoms and $B^2$ is hydrogen or $B^1$ are particularly advantageous. Industrial mixtures which contain from 50 to 90% by weight of the monoalkylated product, for example Dowfax® 2A1 (trademark of Dow Chemical Company), are frequently used. The compounds I are preferably used as dispersants in the novel process alone or, particularly preferably, as a mixture with ethoxylated fatty alcohols (degree of ethoxylation: 3 to 50, alkyl radical: $C_8$ to $C_{36}$). The compounds I are generally known, for example from U.S. Pat. No. 4,269, 749, and are commercially available.

As a rule, the amount of dispersant used is from 0.5 to 6, preferably from 1 to 5, particularly preferably from 2 to 4, % by weight, based on the monomers to be subjected to free radical polymerization.

The component B can then be stirred in a simple manner into the resulting aqueous emulsion of the one or more dispersed polymer(s) A. If the component B is also an emulsion polymer, these statements made with regard to the emulsion polymer particles A are applicable to the associated polymer particle diameters.

The novel aqueous polymer emulsions have a satisfactory shelf life. It is noteworthy that the wet adhesion is essentially unaffected by the postcrosslinking. Surprisingly, films of the novel aqueous polymer emulsions have high water resistance and less tendency to bloom. The BT and MFT are in completely satisfactory balance.

In addition to the obligatory components A and B, the novel aqueous polymer emulsions may contain the conventional assistants for this intended use, tailored to the particular intended use. It is merely necessary substantially to avoid additives containing an aldehyde group, since as a rule they reduce the action principle on which the novel aqueous formulations are based. They should at most be present in minor amounts, ie. at most in a number which is smaller than the number of aldehyde groups introduced in the form of the component B.

The novel aqueous polymer formulations are particularly suitable for coating, adhesive bonding, sealing and impregnating.

Novel aqueous polymer emulsions are typically used in the area of aqueous coating materials, in particular those which are free of organic solvents, where the film formed from the aqueous polymer emulsion adhesively bonds to the substrate.

This area includes in particular surface coatings for interior and exterior applications in the building trade.

Other examples are industrial coating materials, in particular where elevated temperatures cannot be realized or are difficult to realize in their application. Examples of such coatings are finishes, wash primers, insulations and heat-sealable adhesive layers. The novel aqueous polymer emulsions are also suitable for the consolidation of sheet-like fibrous structures. While films of the pure plastics emulsions are suitable for the last-mentioned applications, they are generally pigmented and/or mixed with fillers for the coating sector. Conventional formulations may be used here, the advantages of low MFT, high BT, good gloss and high elongation at break always being displayed. Glazes, finishes, silk gloss coats, gloss coats and high gloss coats and materials for coating leather may be mentioned in particular here. Examples of particularly suitable substrates are wood, leather, metal, plastic and mineral materials. The novel polymers are also suitable as additives in mineral binders, in particular those based on cement.

Especially in the case of interior applications, it is necessary for the novel aqueous polymer emulsions to be substantially free of residual monomers and organic solvents. This can be achieved in a manner known per se, for example by removal by distillation (in particular steam distillation) or by stripping with an inert gas. In the case of a low molecular weight component B, this measure is advantageously carried out before said component is added. Free radical postpolymerization methods can of course also be used (in particular with the action of redox initiator systems), as stated, for example, in DE-A 44 35 423, DE-A 44 19 518 and DE-A 44 35 422 or cited as prior art.

EXAMPLE

A mixture of
380 g of water,
25 g of a 20% strength by weight solution of ethoxylated fatty alcohol (alkyl radical: $C_{16}/C_{18}$ mixture, average degree of ethoxylation: 18)=emulsifier solution 2,
120 g of a 15% strength by weight aqueous solution of sodium lauryl sulfate=emulsifier solution 1,
20 g of feed 1 and
30 g of feed 3,
was initially taken in a polymerization vessel and heated to 85° C. in the course of 10 minutes while stirring. After stirring had been carried out for 10 minutes at 85° C., the remaining amount of feed 1 was continuously metered into the polymerization vessel in the course of 1.5 hours while maintaining the temperature of 85° C. The remaining amount of feed 3 was fed continuously into the polymerization vessel in the course of 2 hours, beginning simultaneously with the remaining amount of feed 1. After the end of feed 1, feed 2 was fed continuously into the polymerization vessel in the course of 30 minutes while still maintaining the temperature of 85° C. The polymerization mixture was then stirred for a further 2 hours at 85° C. Thereafter, it was cooled to 25° C., 6 ml of concentrated aqueous ammonia solution were added and the emulsion was filtered through a filter of 250 µm mesh size.

Feed 1:
200 g of water,
420 g of n-butyl acrylate,
330 g of methyl methacrylate,
10 g of 1-(2-methacryloyloxyethyl)imidazolin-2-one,
7.5 g of acrylic acid,
8.5 g of a 50% strength by weight aqueous solution of acrylamide,
4.3 g of emulsifier solution 1, and
37.5 g of emulsifier solution 2.

Feed 2:
70 g of water,
250 g of methyl methacrylate,
10 g of 1-(2-methacryloyloxyethyl)imidazolin-2-one,
7.5 g of acrylic acid,
1.5 g of a 50% strength by weight aqueous solution of acrylamide,
13.3 g of emulsifier solution 1, and
37.5 g of emulsifier solution 2.

Feed 3:
200 g of water and
1.5 g of sodium peroxodisulfate.

Zg of a 40% strength by weight aqueous glyoxal solution were stirred into 500 ml of each of the resulting aqueous polymer emulsions. The aqueous polymer emulsions obtained were tested as follows for water absorption and resistance to blooming:

a) Determination of the water absorption (WA)

About 500 µm thick polymer films were produced from the glyoxal-containing aqueous polymer emulsions after dilution with water to a solids content of 25% by weight, by converting a defined amount of aqueous polymer emulsion into a film over a period of 5 days at 23° C. and 50% relative humidity in a silicone pan.

The polymer films were then removed from the silicone pan, and sheet-like square film pieces (about 4 cm²) were punched out. These were placed in 100 ml of demineralized water for 24 hours at 23° C.

The water absorption of the sample pieces was determined gravimetrically. It is stated in the table in % by weight, based on the initial weight of the test specimen.

b) Determination of the resistance to blooming (RB)

The glyoxal-containing aqueous polymer formulations were applied by means of a knife coater to a glass sheet to give a layer which was 200 μm thick when wet, and were converted into a film over a period of 24 hours at 23° C. and 50% relative humidity. The glass sheets coated in this manner were placed vertically, at 23° C. for 4 hours, in a trough filled with demineralized water.

The sheets were then removed from the trough and the films were checked visually for blooming and blister formation.

The results obtained are shown in the table.

TABLE

| Amount of emulsion | Z | Molar ratio R of ureido/aldehyde groups | WA (% by weight) | RB |
|---|---|---|---|---|
| 500 ml | — | — | 28.2 | Many small blisters, very great opacity |
| 500 ml | 0.43 | 1:0.25 | 22.3 | Many small blisters, great opacity |
| 500 ml | 0.86 | 1:0.5 | 20.1 | No blister formation, slight opacity |
| 500 ml | 1.72 | 1:1 | 18.9 | No blister formation, no opacity (transparent film) |

Blocking resistance, wet adhesion and low minimum film formation temperature were obtained.

We claim:

1. An aqueous polymer emulsion, comprising:
   A) at least one dispersed polymer A obtained by polymerizing a composition 1 comprising at least one monomer having at least one ethylenically unsaturated group by a free radical aqueous emulsion polymerization method to a conversion of at least 90% by weight, based on the monomer composition 1 to be polymerized (polymerization stage 1), followed by polymerizing, in the presence of the product of polymerization stage 1, a composition 2 comprising at least one monomer having at least one ethylenically unsaturated group by a free radical aqueous emulsion polymerization method (polymerization stage 2), with the proviso that
      a) the composition 1 is such that random copolymerization of the composition 1 alone provides a polymer 1 whose glass transition temperature tends to the $Tg^1$ with increasing molecular weight,
      b) the composition 2 is such that random copolymerization of the composition 2 alone provides a polymer 2 whose glass transition temperature tends to the $Tg^2$ with increasing molecular weight,
      c) the difference between $Tg^1$ and $Tg^2$ is at least 20° C.,
      d) the amount of that composition 1 or 2 which has the lower Tg is from 40 to 90% by weight, based on the total amount of the compositions 1 and 2, and
      e) in addition to the monomers of the compositions 1 and 2, at least one adhesion-promoting monomer which differs from these monomers and has at least one ethylenically unsaturated group and at least one group of the formula I

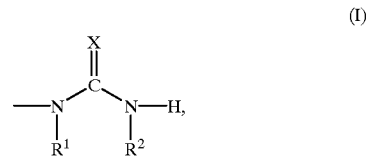

where X is O or S and
      $R^1$ and $R^2$ are both hydrogen or $C_1$–$C_5$-alkyl or both together form a bridging $C_2$–$C_4$-alkylene group which may be monosubstituted or disubstituted by $C_1$–$C_4$-alkoxy or hydroxyl,
   is polymerized, in stage 1 or stage 2 or distributed over both polymerization stages in an amount of from 0.1 to 30% by weight, based on the total amount of the monomers to be polymerized,
   B) at least one chemical compound B having at least two unprotected reversibly protected aldehyde groups, with the proviso that the molar ratio R of all the groups of formula I contained in the aqueous polymer emulsion to the total molar amount of unprotected or reversibly protected aldehyde groups contained in the aqueous polymer emulsion in the form of compounds B is from 0.1:1 to 10:1, and
   C) in the absence of carboxylic hydrazide.

2. An aqueous polymer emulsion as claimed in claim 1, wherein the amount of the monomer composition 1 or 2 which has the lower Tg is from 60 to 80% by weight, based on the total amount of the compositions 1 and 2.

3. An aqueous polymer emulsion as claimed in claim 1, wherein the difference between $Tg^1$ and $Tg^2$ is from 20 to 150° C.

4. An aqueous polymer emulsion as claimed in claim 1, wherein the polymerization stage 1 relates to the monomer composition 1 or 2 which has the lower Tg.

5. An aqueous polymer emulsion as claimed in claim 1, wherein the polymerization stage 1 relates to the monomer composition 1 or 2 which has the higher Tg.

6. An aqueous polymer emulsion as claimed in claim 1, wherein the amount of the monomers having at least one ethylenically unsaturated group and at least one group of the formula I is from 0.5 to 10% by weight, based on the total amount of the monomers to be polymerized.

7. An aqueous polymer emulsion as claimed in claim 1, wherein 1-(2-methacryloyloxyethyl)imidazolin-2-one is used concomitantly as the monomer having at least one ethylenically unsaturated group and at least one group of the formula I.

8. An aqueous polymer emulsion as claimed in claim 1, wherein the monomer composition 1 or 2 which has the higher Tg comprises monomers effecting precrosslinking.

9. An aqueous polymer emulsion as claimed in claim 1, wherein the monomer compositions 1 and 2 are selected from the group consisting of n-butyl acrylate, 2-ethylhexyl acrylate, ethyl acrylate, methyl methacrylate, n-butyl methacrylate, styrene, acrylonitrile, acrylic acid, methacrylic acid, acrylamide, methacrylamide, hydroxyethyl acrylate, hydroxyethyl methacrylate, acrylamidopropanesulfonic acid, vinylsulfonic acid and the alkali metal salts thereof.

10. An aqueous polymer emulsion as claimed in claim 1, whose MFT is ≦30° C. without the addition of film formation assistants.

11. An aqueous polymer emulsion as claimed in claim 1, wherein the total amount of the monomers having at least one ethylenically unsaturated group and at least one group of formula I are polymerized exclusively in polymerization stage 2, and the polymerization stage 2 comprises the monomer composition 1 or 2 having the lower Tg.

12. An aqueous polymer emulsion as claimed in claim 1, wherein from 20 to 100 mol% of the total amount of the monomers having at least one group of formula I are polymerized in the polymerization stage 1, and the polymerization stage 1 comprises the monomer composition 1 or 2 having the lower Tg.

13. An aqueous polymer emulsion as claimed in claim 1, wherein the component B is glyoxal or glutardialdehyde.

14. An aqueous polymer emulsion as claimed in claim 1, wherein the solids content is from 40 to 70% by volume.

15. An aqueous polymer emulsion as claimed in claim 1, wherein the weight average particle diameter of the polymer A is from 50 to 150 nm.

16. An aqueous polymer emulsion as claimed in claim 1, wherein the monomer composition 1 or 2 having the lower Tg comprises from 10 to 40% by weight, based on the monomer composition 1 or 2, of monomers whose homopolymers have Tg values above the lower Tg and, the monomer composition 1 or 2 having the higher Tg value simultaneously comprises from 0 to 40% by weight, based on the monomer composition 1 or 2, of monomers whose homopolymers have Tg values below the higher Tg.

17. An aqueous polymer emulsion as claimed in claim 1, wherein both the monomer composition 1 and the monomer composition 2 are metered continuously into the polymerization vessel in the course of the polymerization stages 1 and 2 as a corresponding monomer mixture which may be preemulsified in an aqueous medium, and the monomers which are to be polymerized the particular polymerization stage and have at least one ethylenically unsaturated group and at least one group of formula I are fed to the polymerization vessel after being mixed in the corresponding monomer mixture or 2, or 1 and 2.

18. An aqueous polymer emulsion as claimed in claim 17, wherein the continuous monomer feed is carried out in such a way that the polymerization conversion of the monomers already fed into the polymerization vessel is ≧90%, by weight at any time after the beginning of the polymerization.

19. An aqueous color formulation comprising an aqueous polymer emulsion as claimed in claim 1 as a binder.

20. An aqueous coating, impregnating or adhesive formulation containing an aqueous polymer emulsion as claimed in claim 1.

21. A substrate which is coated, impregnated or adhesively bonded with an aqueous formulation which contains an aqueous polymer emulsion as claimed in claim 1.

22. A process for the preparation of an aqueous polymer emulsion, comprising:
A) polymerizing a composition 1 comprising at least one monomer having at least one ethylenically unsaturated group by a free radical aqueous emulsion polymerization method to a conversion of at least 90% by weight, based on the monomer composition 1 to be polymerized, (polymerization stage 1), followed by polymerizing a composition 2 comprising at least one monomer having at least one ethylenically unsaturated group in the presence of the product of polymerization stage 1 by a free radical aqueous emulsion polymerization method (polymerization stage 2), with the proviso that
a) the composition 1 is such that random copolymerization of the composition 1 alone provides polymer 1 whose glass transition temperature tends to the $Tg^1$ with increasing molecular weight,
b) the composition 2 is such that random copolymerization of the composition 2 alone provides polymer 2 whose glass transition temperature tends to the $Tg^2$ with increasing molecular weight,
c) the difference between $Tg^1$ and $Tg^2$ is at least 20° C.,
d) the amount of that composition 1 or 2 which has the lower Tg is from 40 to 90% by weight, based on the total amount of the compositions 1 and 2, and
e) in addition to the monomers of the compositions 1 and 2, at least one adhesion-promoting monomer which differs from these monomers and has at least one ethylenically unsaturated group and at least one group of the formula I

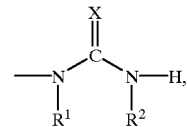

where
X is O or S and
$R^1$ and $R^2$ are both hydrogen or $C_1$–$C_5$-alkyl or both together form a bridging $C_2$–$C_4$-alkylene group which may be monosubstituted or disubstituted by $C_1$–$C_4$-alkoxy or hydroxyl,
is polymerized, in stage 1 or stage 2 or distributed over both polymerization stages in an amount of from 0.1 to 30% by weight, based on the total amount of the monomers to be polymerized,
and
B) at least one compound B having at least two unprotected or reversibly protected aldehyde groups is added to the aqueous polymer emulsion obtained under A), with the proviso that the molar ratio R of all the groups of formula I contained in the aqueous polymer emulsion A to the total molar amount of unprotected or reversibly protected aldehyde groups added in the form of compounds B is from 0.1:1 to 10:1.
and
C) in the absence of added carboxylic hydrazides to the aqueous polymer emulsion.

23. The aqueous polymer emulsion as claimed in claim 17, wherein the continuous monomer feed is carried out in such a way that the polymerization conversion of the monomers already fed into the polymerization vessel is ≧95% by weight at any time after the beginning of the polymerization.

24. The aqueous polymer emulsion as claimed in claim 17, wherein the continuous monomer feed is carried out in such a way that the polymerization conversion of the monomers already fed into the polymerization vessel is ≧98% by weight at any time after the beginning of the polymerization.

* * * * *